United States Patent
Kumbhari

(10) Patent No.: US 10,917,296 B2
(45) Date of Patent: *Feb. 9, 2021

(54) MANAGING AND TROUBLESHOOTING CHANGES IN DEVICE CONFIGURATIONS ON A NETWORK NODE

(71) Applicant: Juniper Networks, Inc., Sunnyvale, CA (US)

(72) Inventor: Uday Kishore Kumbhari, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/599,031

(22) Filed: Jan. 16, 2015

(65) Prior Publication Data

US 2015/0134696 A1     May 14, 2015

Related U.S. Application Data

(63) Continuation of application No. 13/291,240, filed on Nov. 8, 2011, now Pat. No. 8,938,470.

(51) Int. Cl.
*G06F 16/00* (2019.01)
*H04L 12/24* (2006.01)
(Continued)

(52) U.S. Cl.
CPC ...... *H04L 41/0816* (2013.01); *G06F 16/2455* (2019.01); *H04L 41/0813* (2013.01);
(Continued)

(58) Field of Classification Search
CPC .................................................. G06F 17/30477
(Continued)

(56) References Cited

U.S. PATENT DOCUMENTS 6,219,708 B1    4/2001   Martenson
6,519,625 B1    2/2003   Murrell et al.
(Continued)

OTHER PUBLICATIONS

Distributed Management Task Force, Inc., "Desktop Management Interface Specification", Version 2.0.1s, Jan. 10, 2003, 245 pages.
(Continued)

*Primary Examiner* — Anhtai V Tran
(74) *Attorney, Agent, or Firm* — Harrity & Harrity, LLP

(57) ABSTRACT

A system is configured to monitor traffic being transmitted among a group of nodes; detect a configuration statement being transported from a first node to a second node, where the configuration statement identifies a first configuration to be implemented on the second node; create a record, associated with the configuration statement, that identifies a manner in which a second configuration, that existed on the second node before receiving the configuration statement, is to be changed to the first configuration, where the record includes terms obtained from the configuration statement; generate tags, associated with the record, based on the terms or a first identifier associated with the second node; and associate the tags with the record, where associating the tags with the record allows a search to be performed, using a search query based on the tags, to obtain a configuration history that includes the record or another record.

20 Claims, 8 Drawing Sheets

(51) Int. Cl.
*G06F 16/2455* (2019.01)
*H04L 12/751* (2013.01)

(52) U.S. Cl.
CPC ...... *H04L 41/0859* (2013.01); *H04L 41/0886* (2013.01); *H04L 41/0893* (2013.01); *H04L 45/02* (2013.01); *H04L 41/0873* (2013.01)

(58) Field of Classification Search
USPC .......................................................... 707/769
See application file for complete search history.

(56) References Cited

U.S. PATENT DOCUMENTS

| | | | |
|---|---|---|---|
| 6,571,285 | B1 | 5/2003 | Groath et al. |
| 7,496,650 | B1 * | 2/2009 | Previdi ................. H04L 45/028 370/229 |
| 7,640,394 | B2 | 12/2009 | Kanno et al. |
| 7,653,742 | B1 | 1/2010 | Bhargava et al. |
| 8,938,470 | B1 | 1/2015 | Kumbhari |
| 9,736,030 | B1 | 8/2017 | Kishore et al. |
| 2002/0165902 | A1 | 11/2002 | Robb et al. |
| 2003/0055960 | A1 | 3/2003 | Hain |
| 2003/0135630 | A1 | 7/2003 | Murrell et al. |
| 2003/0172151 | A1 | 9/2003 | Schade |
| 2004/0054776 | A1 | 3/2004 | Klotz et al. |
| 2004/0215646 | A1 * | 10/2004 | Kaler ....................... G06F 8/71 |
| 2006/0020729 | A1 * | 1/2006 | Nakamura ........ H04L 12/40058 710/113 |
| 2006/0031442 | A1 | 2/2006 | Ashley et al. |
| 2006/0235977 | A1 | 10/2006 | Wunderlich et al. |
| 2007/0078770 | A1 | 4/2007 | Hsieh et al. |
| 2007/0294209 | A1 | 12/2007 | Strub et al. |
| 2008/0068136 | A1 * | 3/2008 | Malik ................... H04W 8/245 340/10.5 |
| 2009/0201799 | A1 * | 8/2009 | Lundstrom ............. H04L 41/06 370/217 |
| 2010/0145978 | A1 | 6/2010 | Anashkin et al. |
| 2010/0211826 | A1 | 8/2010 | Villella et al. |
| 2011/0035390 | A1 | 2/2011 | Whitehouse et al. |
| 2011/0107300 | A1 | 5/2011 | Vidal et al. |
| 2011/0246460 | A1 * | 10/2011 | Hsieh .................... G06Q 30/02 707/736 |

OTHER PUBLICATIONS

Speed time to resolution with real-time, consolidated event analysis, Tivoli software, IBM Tivoli Netcool/Impact, Mar. 2007, 8 pages.
Service management solutions White paper, Tivoli software, Netcool + Tivoli: delivering service management innovation, Aug. 2006, 28 pages.
IBM Software Tivoli, IBM Tivoli Netcool/Impact, Streamline event and alert management, and incident and problem management processes, Dec. 2010, 8 pages.
Security Threat Response Manager, Adaptive Log Exporter Users Guide, Release 2009.1, Feb. 2010, 72 pages.
Co-pending U.S. Appl. No. 13/337,781 entitled "Monitoring Network Management Activity", filed Dec. 27, 2011, by Kishore et al., 45 pages.

* cited by examiner

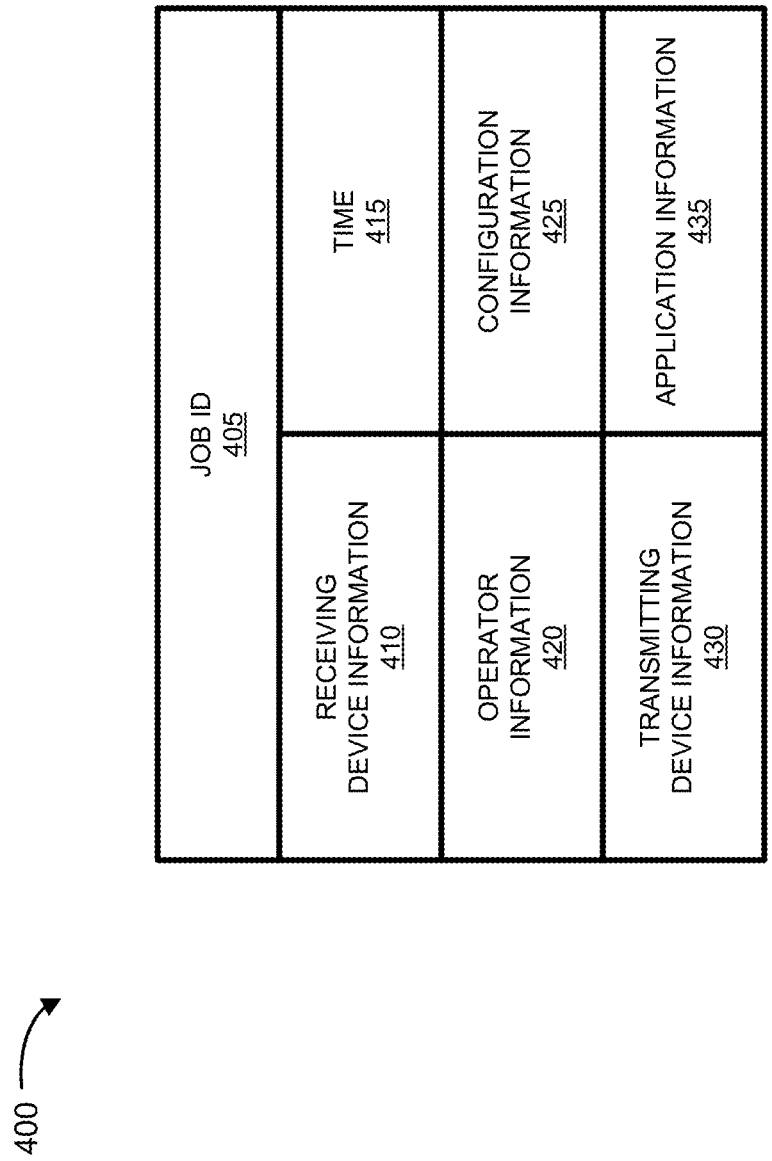

700

Configuration Change History

705 — ENTER DEVICE TAG: 110-2
710 — ENTER JOB TAG:
715 — ENTER CONFIGURATION TAG:

717 — SEARCH

720 — RECORD(S) FOUND

750 —
<configuration of node 110-2 related to set protocols OSPF area before change> set protocols OSPF area 0.0.0.0
<configuration of node 110-2 related to set protocols OSPF area before change> set protocols OSPF area 0.0.0.0
<configuration of node 110-2 related to routing options static route before change> routing options static route
<configuration of node 110-2 related to routing options static route before change> routing options static route

| JOB ID | DEVICE ID | EXISTING CONFIGURATION | CONFIGURATION STATEMENT | TIME | APPLICATION ID |
|---|---|---|---|---|---|
| 722 | 725 | 730 | 735 | 740 | 745 |
| 101 | 110-2 | protocol ospf... | set protocol OSPF area 0.0... | 12:46:36 | app A |
| 101 | 110-2 | routing options static... | set routing options static... | 12:46:36 | app B |
| 102 | 110-2 | routing options static... | set routing options static... | 12:47:36 | app B |
| 102 | 110-2 | protocol ospf... | set protocol OSPF area 0.0... | 12:47:36 | app A |

MANAGING AND TROUBLESHOOTING CHANGES IN DEVICE CONFIGURATIONS ON A NETWORK NODE

RELATED APPLICATION

This application is a continuation of U.S. patent application Ser. No. 13/291,240, filed Nov. 8, 2011 (now U.S. Pat. No. 8,938,470), which is incorporated herein by reference.

BACKGROUND

Communication networks typically include nodes, such as routers, firewalls, switches, or gateways, which transfer or switch data, such as packets, from one or more sources to one or more destinations. The nodes may operate on the data as the data traverses the network, such as by forwarding or filtering the data.

Network management systems manage the networks by monitoring and/or controlling the nodes to control traffic flow, address conditions on the nodes or within the network, provide software updates, etc. Another way that the network management systems monitor and/or control nodes is by tracking configuration statements being transmitted between the nodes to update forwarding and/or control plane protocols, network policies (e.g., quality of service (QoS) policies, security policies, etc.), and/or other protocols or policies. Sometimes, conflicting configuration statements are transmitted between nodes, which can cause conditions to occur within the network. Unfortunately, it is not always possible to identify which configuration statements caused the condition, to identify nodes that are affected by the configuration statements, and/or to troubleshoot the conditions using the configuration statements.

SUMMARY

According to one aspect, a method, may include monitoring, by a server device, traffic being transmitted among a group of nodes associated with a network; and detecting, by the server device and as a result of monitoring the traffic, a configuration statement being transported from a first node of the group of nodes and to a second node, of the group of nodes, where the configuration statement may identify a first configuration to be implemented on the second node. The method may also include creating, by the server device, a record, associated with the configuration statement, that identifies a manner in which a second configuration, that existed on the second node before receiving the configuration statement, is to be changed to the first configuration, where the record includes one or more terms obtained from the configuration statement; generating, by the server device, one or more tags based on at least one of the one or more terms, or a first identifier associated with the second node; and associating, in a memory associated with the server device, the one or more tags with the record, where associating the one or more tags with the record may allow a search to be performed, using a search query based on the one or more tags, to obtain a configuration history, associated with the second node, based on the record or another record.

According to another aspect, a device may include a memory to store records that identify configuration changes that have occurred on one or more nodes over a period of time and a group of tags that correspond to the records, where the group of tags may include first tags that identify the one or more nodes, second tags that include terms, obtained from the records, that identify one or more types of configuration changes, and third tags that identify one or more jobs associated with the configuration changes. The device may also include one or more processors to receive a search query that includes at least one tag; and search the group of tags, based on the search query, to identify one or more other tags, of the group of tags, that match the at least one tag. The device may further include the one or more processors to obtain, from the memory, one or more of the records, that correspond to the one or more other tags, where the one or more records may identify at least one of one or more configuration changes that occurred on a node, of the one or more nodes, when the at least one tag includes a first tag that identifies the node, a type of configuration change, when the at least one tag includes a second tag that identifies the type of configuration change, or one or more configuration changes associated with a job when the at least one tag includes a third tag that identifies the job; and provide the one or more records.

According to still another aspect, one or more computer-readable media, containing one or more instructions, which when executed by at least one processor, may cause the at least one processor to monitor traffic, traveling within a network, between a first node and second node; identify as a result of monitoring the traffic, a configuration statement being transmitted by the first node to the second node, where the configuration statement identifies a type of configuration to be set up on the second node; and create a record, associated with the configuration statement, that identifies a manner in which the configuration is to be set up. The one or more computer-readable media, containing the one or more instructions, which when executed by the at least one processor, may also cause the at least one processor to generate a group of tags based on the record, where the group of tags may include a first tag that includes an identifier for a job with which the configuration statement is associated, a second tag that includes terms included within the record, or a third tag based on an identifier associated with the second node; and store the plurality of tags and the record to allow the record to be retrieved as a result of a search using a search query based on at least one of the plurality of tags.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 4A is a diagram of an example data structure that stores information associated with a job to update a configuration associated with a network node of FIG. 1;

FIG. 7 is a diagram of an example user interface that allows an operator, associated with a network management device of FIG. 1, to perform a search for a record.

DETAILED DESCRIPTION

The following detailed description refers to the accompanying drawings. The same reference numbers in different drawings may identify the same or similar elements.

A system and/or method, described herein, may enable a network management device to monitor traffic within a network to detect a configuration statement being transported between nodes within the network. The network management device may create one or more records based on the configuration statement and each node to which the configuration statement is transported.

The system and/or method may enable the network management device to generate one or more types of tags for each of the configuration statements. For example, the network management device may generate a device tag, based on a record, that identifies a node to which the configuration statement is being sent. The network management device may also generate a job tag that identifies a job with which the configuration statement is associated. The network management device may further generate a configuration statement tag, based one or more recognizable terms associated with the record.

The system and/or method may allow an operator, of the network management device, to perform a search using a tag-based search query (e.g., a search query based on one or more types of tags). The network management device may, based on the tag-based search query, obtain records associated one or more tags included within the tag-based search query. Performing a search using tag-based search queries, may allow the operator to manage configuration changes associated with the node, and/or to identify and troubleshoot a condition associated with the node.

Figure 1:
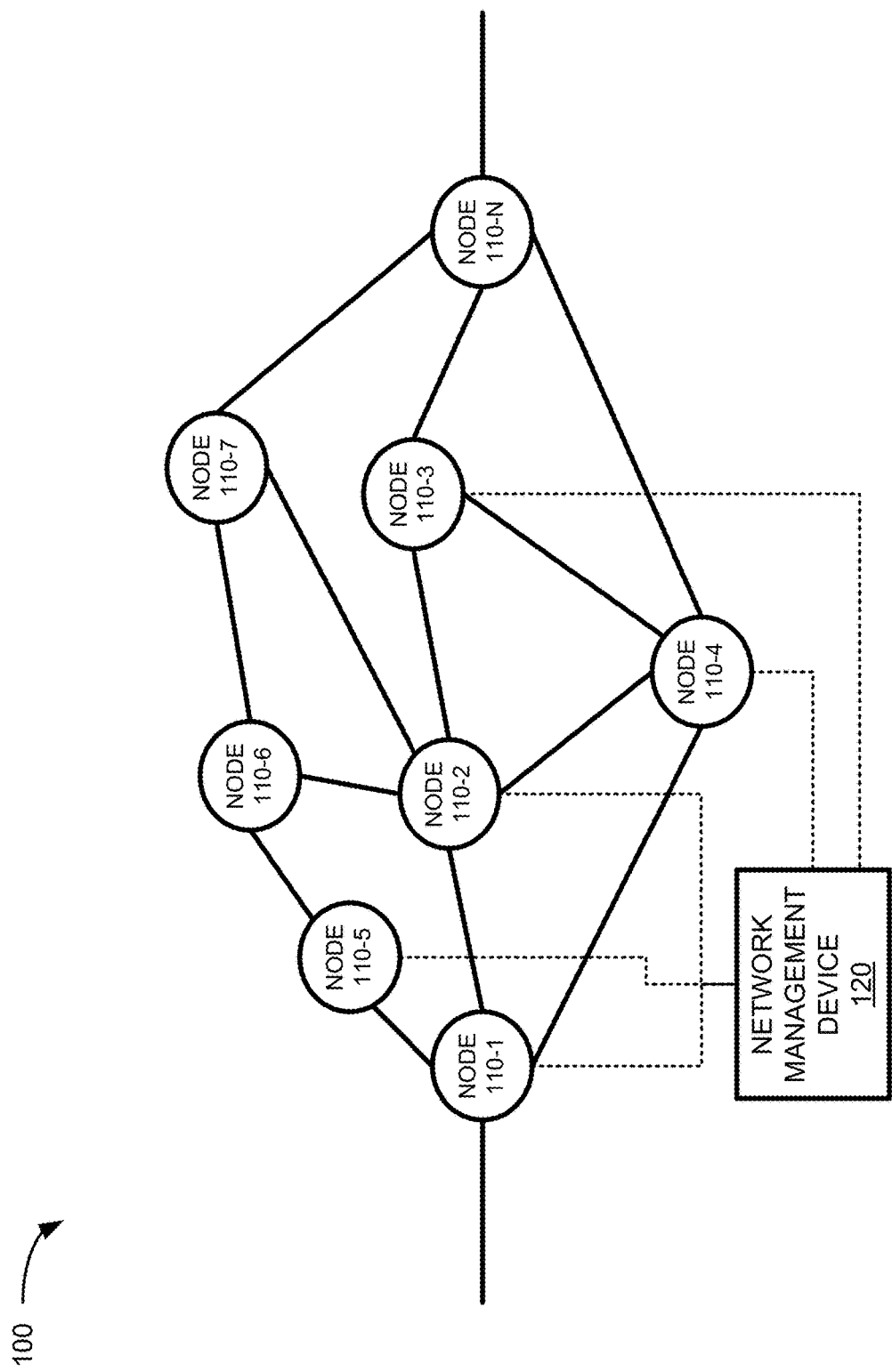
FIG. 1 is a diagram of an example network in which systems and/or methods described herein may be implemented.

FIG. 1 is a diagram of an example network 100 in which systems and/or methods described herein may be implemented. As shown in FIG. 1, network 100 may include a group of nodes 110-1, . . . , 110-N (where N≥1) (hereinafter referred to collectively as "nodes 110" and individually as "node 110") and a network management device 120 (hereinafter referred to as "management device 120"). The quantity of nodes and/or devices, illustrated in FIG. 1, is provided for explanatory purposes only. In practice, there may be additional nodes and/or devices, fewer nodes and/or devices, different nodes and/or devices, or differently arranged nodes and/or devices than illustrated in FIG. 1. Also, in some implementations, one or more of the nodes and/or devices, of network 100, may perform one or more functions described as being performed by another one or more of the nodes and/or devices of network 100. The nodes and/or devices of network 100 may interconnect via wired connections, wireless connections, or a combination of wired and wireless connections.

Node 110 may include a network device that transmits traffic (e.g., packets). For example, node 110 may take the form of a routing device, a switching device, a multiplexing device, a firewall device, or a device that performs a combination of routing, switching, security functions, and/or multiplexing functions. In one implementation, node 110 may be a digital device. In another implementation, node 110 may be an optical device. In yet another implementation, node 110 may be a combination of a digital device and an optical device.

Node 110 may include an internal or external storage device and/or memory that stores information associated with node 110 operations. In one example, node 110 may store, in the storage device and/or memory, network topology information, routing tables, and/or packet forwarding tables. Node 110 may receive, process, and/or transmit packets traversing network 100. Node 110 may add and/or append (push) information (e.g., headers, trailers, tags, etc.) to incoming and/or outgoing packets. Node 110 may remove and/or extract information from incoming and/or outgoing packets.

Node 110 may transmit a configuration statement to another node 110, which may cause the other node 110 to change a control plane protocol, forwarding plane protocol, security policy, virtual local area network (VLAN) port configuration, quality of service (QoS) policy, etc., based on the configuration statement. Node 110 may transmit information associated with a configuration on which node 110 is operating, to management device 120.

Management device 120 may include one or more server devices, or other types of computation or communication devices, that gather, process, search, store, and/or provide information in a manner described herein. Management device 120 may monitor traffic being transported between nodes 110. Management device 120 may, based on monitoring the traffic, identify a configuration statement being transmitted to node 110. Management device 120 may identify a job with which the configuration statement is associated and may store, in a memory associated with management device 120, information associated with the job (e.g., a job identifier, information associated with node 110, a time when the configuration statement was transmitted, the configuration statement, etc.).

Management device 120 may also, or alternatively, identify terms (e.g., words, phrases, commands, strings, etc.), within the configuration statement, that match standard terms stored in the memory. The standard terms may correspond to different types of configuration changes (e.g., changes in forwarding protocols, security policies, QoS policies, VLAN configurations, etc.) that can be identified by configuration statements. Management device 120 may use the identified terms to generate a record based on the configuration statement. The record may include a first portion that identifies a configuration that existed on node 110 prior to receiving the configuration statement and a second portion that identifies a configuration that is to be established on node 110 based on the configuration statement.

Management device 120 may, based on the information associated with the job and the record, generate one or more tags associated with the record. A first type of tag (e.g., a device tag) may include an identifier (e.g., a device identifier, a network address, etc.) associated with node 110. A second type of tag (e.g., a job tag) may include an identifier (e.g., a job identifier) associated with the job. A third type of tag (e.g., a configuration tag) may include the identified terms associated with the configuration statement.

Management device 120 may perform searches for information associated with the job, one or more records, a configuration history associated with node 110, etc. based on search queries received from an operator of management device 120. The search queries may be based on tags obtained from records and/or configuration statements detected on network 100. Additionally, or alternatively, management device 120 may present a web service that can be accessed, by an operator of management device 120 and/or a user of a user device, to perform the search. Management device 120 may also, or alternatively, allow an operator to enter a command (e.g., that identifies a tag), via a command line, that may cause management device 120 to retrieve records, information associated with a job, and/or a configuration statement associated with the tag identified by the command.

Figure 2:
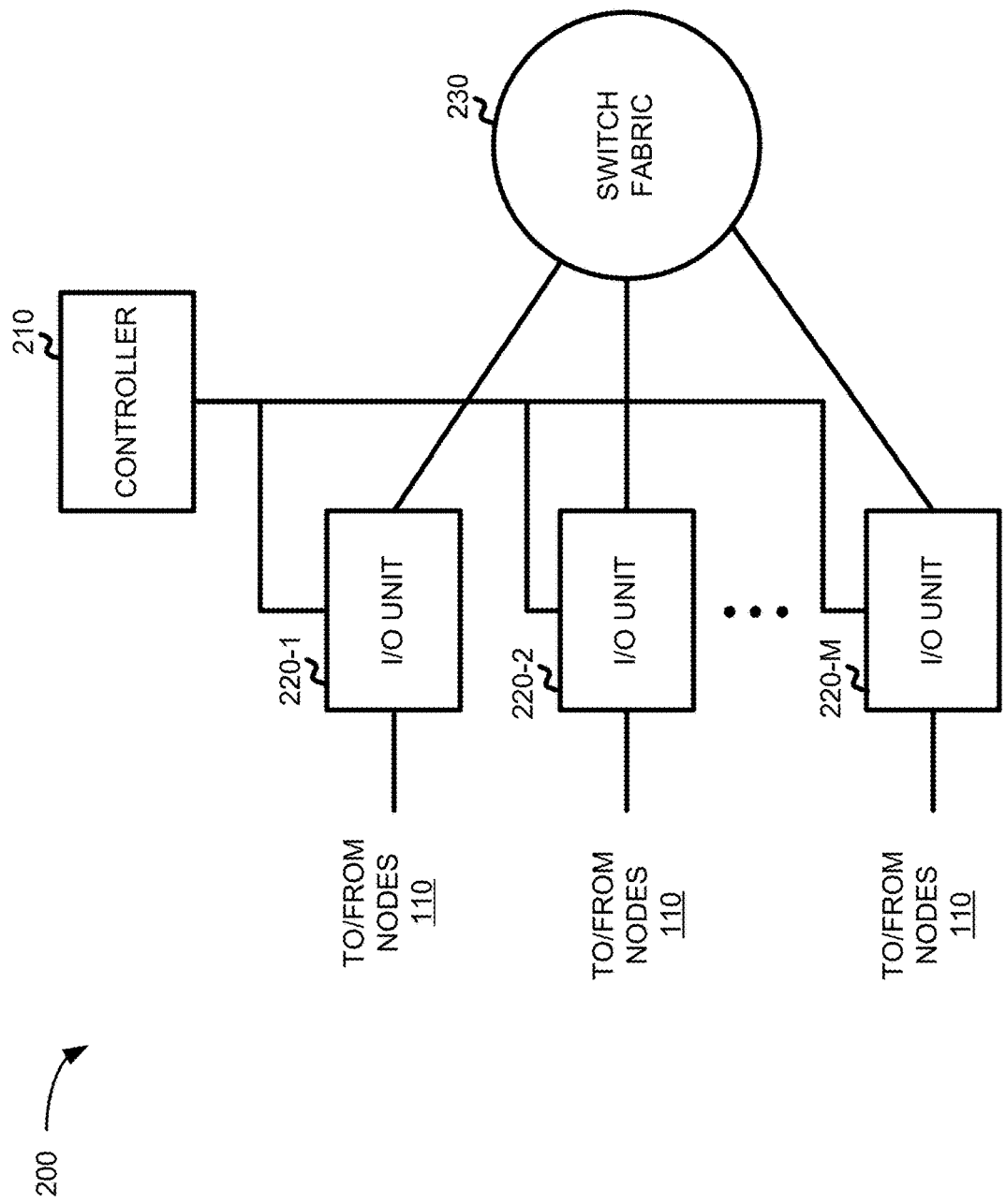
FIG. 2 is a diagram of example components of one or more network nodes of FIG. 1.

FIG. 2 is a diagram of example components of a device 200 that may correspond to node 110. Additionally, or alternatively, each node 110 may include one or more of devices 200 and/or one or more components of device 200.

Device 200 may include a controller 210, a set of input/output (I/O) units 220-1, 220-2, . . . , 220-M (where M≥1) (hereinafter referred to collectively as "I/O units 220" and individually as "I/O unit 220"), and a switch fabric 230. Although, FIG. 2 illustrates example components of device 200, in other implementations, device 200 may include additional components, fewer components, different components, or differently arranged components than those illustrated in FIG. 2 and described herein. Additionally, or alternatively, one or more operations described as being performed by a particular component of device 200 may be performed by one or more other components, in addition to or instead of the particular component of device 200.

Controller 210 may include one or more processors, one or more microprocessors, or some form of hardware logic (e.g., an application specific integrated circuit (ASIC) or a field programmable gate array (FPGA)). In one example implementation, controller 210 may include an Ethernet controller and/or another controller device. Controller 210 may perform high-level management functions for device 200. For example, controller 210 may create routing tables based on network topology information, create forwarding tables based on the routing tables, and communicate the forwarding tables to I/O units 220. I/O units 220 may use the forwarding tables to perform route lookups for incoming packets and perform the forwarding functions for device 200. Controller 210 may also perform other general control and monitoring functions for device 200. Controller 210 may perform operations to change a configuration, associated with node 110, in response to a configuration statement received from another node 110. Controller 210 may transmit information associated with the changed configuration to I/O units 220 and/or may permit I/O units 220 to access to the changed configuration that may allow I/O units 220 to process packets based on the changed configuration.

I/O unit 220 may include one or more components to receive incoming packets, to process incoming and/or outgoing packets, and/or to transmit outgoing packets. For example, I/O unit 220 may include I/O ports, a packet forwarding component (PFC), an Ethernet interface and/or another type of interface, a central processing unit (CPU), and/or a memory device. I/O unit 220 may include a collection of ports that receive or transmit packets via physical links I/O unit 220 may also include packet processing component(s), switch interface component(s), Internet processor component(s), memory device(s), etc.

Each of I/O units 220 may be connected to controller 210 and switch fabric 230. I/O units 220 may receive packet data on physical links connected to a network (e.g., network 100). Each physical link could be one of many types of transport media, such as an optical fiber or an Ethernet cable.

I/O units 220 may process incoming packet data prior to transmitting the data to another I/O unit 220 or the network. I/O units 220 may perform route lookups for the data using a forwarding table from controller 210 to determine destination information. If the destination indicates that the data should be sent out on a physical link, connected to I/O unit 220, then I/O unit 220 may prepare the data for transmission by, for example, adding any necessary headers and/or transmitting the data from the port associated with the physical link. If the destination indicates that the data should be sent to another I/O unit 220 via switch fabric 230, then I/O unit 220 may, if necessary, prepare the data for transmission to the other I/O unit 220 and/or may transmit the data to the other I/O unit 220 via switch fabric 230.

Switch fabric 230 may include one or multiple switching planes to facilitate communication among I/O units 220 and/or controller 210. In one implementation, each of the switching planes may include a single-stage switch or a multi-stage switch of crossbar elements. Switch fabric 230 may also, or alternatively, include processors, memories, and/or paths that permit communication among I/O units 220 and/or controller 210.

Figure 3:
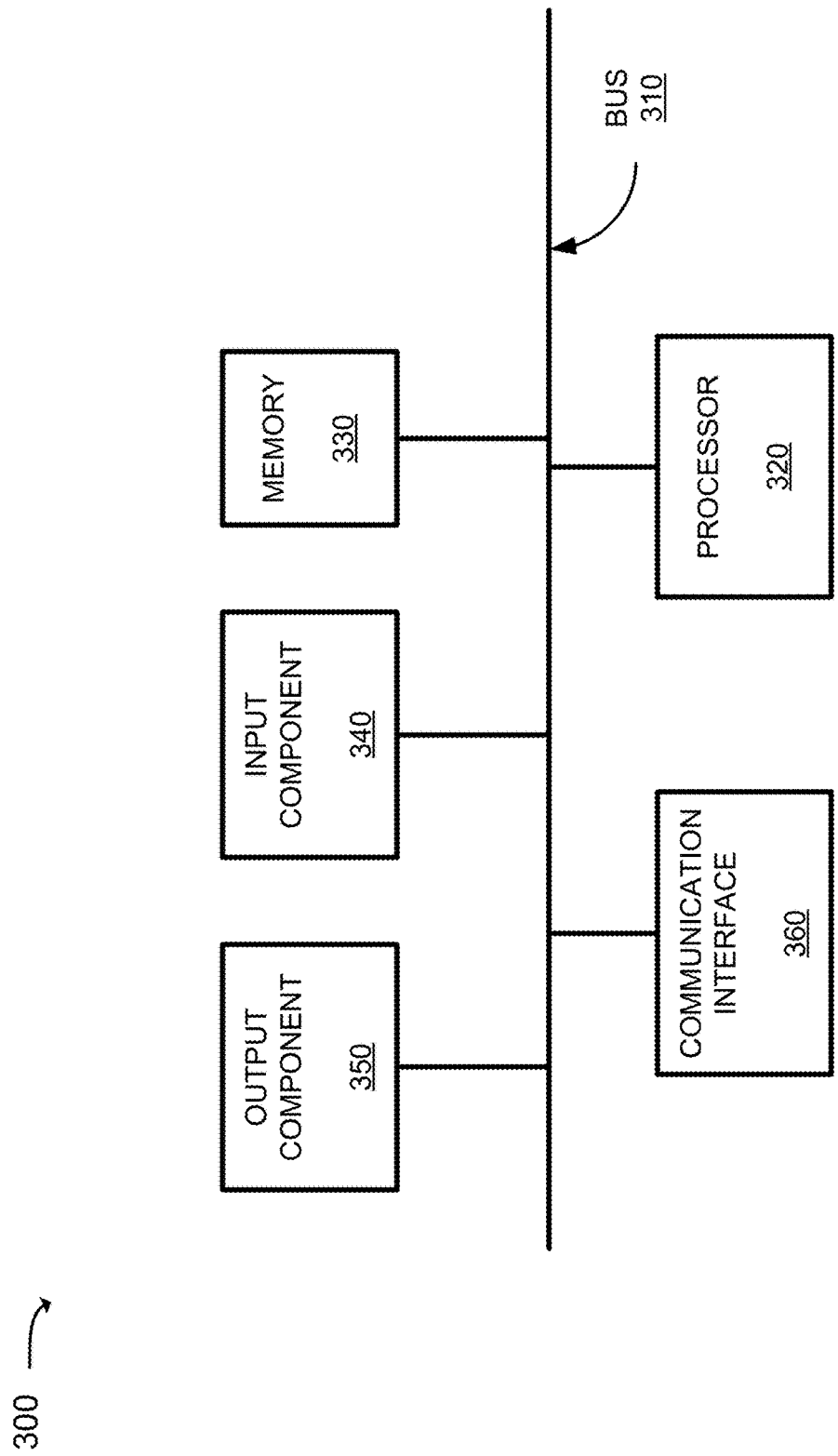
FIG. 3 is a diagram of example components of a network management device of FIG. 1.

FIG. 3 is a diagram of example components of a device 300 that may correspond to management device 120. Alternatively, management device 120 may include one or more devices 300 and/or one or more components of device 300. Device 300 may include a bus 310, a processor 320, a memory 330, an input component 340, an output component 350, and a communication interface 360. Although FIG. 3 shows example components of device 300, in other implementations, device 300 may contain fewer components, additional components, different components, or differently arranged components than depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Bus 310 may include a path that permits communication among the components of device 300. Processor 320 may include one or more processors, microprocessors, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as network 100. In one alternative implementation, communication interface 360 may be a logical component that includes input and output ports, input and output systems, and/or other input and output components that facilitate the transmission of data to other devices.

As described herein, device 300 may perform certain operations associated with generating tags for use in managing and troubleshooting configuration changes in nodes 110. Device 300 may perform these and other operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

FIG. 4A is a diagram of an example data structure 400 that stores information associated with a job. Data structure 400 may be stored in a memory and/or storage device associated with management device 120. As shown in FIG. 4A, data structure 400 may include a collection of fields, such as a job identifier (ID) field 405, a receiving device information field 410, a time field 415, an operator information field 420, a configuration information field 425, a transmitting device information field 430, and an application field 435. The quantity of fields in data structure 400 is included for explanatory purposes. In practice, data structure 400 may include additional fields, fewer fields, or different fields than are described with respect to data structure 400.

Job ID field 405 may store information (e.g., a job identifier) that uniquely identifies a job being performed on network 100. Receiving device information field 410 may store information (e.g., a device identifier, a network address, etc.) associated with node 110 on which the job is being performed. Time field 415 may identify a first time at which the job was started and/or a second time at which the job ended.

Operator information field 420 may store information that identifies a network administrator (e.g., a username, a password, a personal identification number, etc.) that caused the job to be performed. The network administrator may be associated with management device 120 and/or one or more nodes 110. In another example, the job may be initiated automatically by node 110 and, in this case, operator information field 420, may not store information that identifies the network administrator. Configuration information field 425 may store information associated with a configuration change to be implemented on node 110 identified by receiving device information field 410. The information associated with the configuration change may identify a type of configuration change and/or a type of job to be implemented on node 110 (e.g., update security protocols, forwarding protocols, a VLAN configuration, a QoS policy, etc.). The information associated with the configuration change may also, or alternatively, be associated with a configuration statement transmitted, to node 110, by another node 110.

Transmitting device information field 430 may store information (e.g., a device identifier, a network address, etc.) associated with the other node 110 that transmitted an instruction (e.g., a configuration statement) to node 110 to change a configuration. Application information field 435 may store information that identifies an application, a workflow, a task, etc., associated with the other node 110, that triggered the configuration change.

Figure 4B:
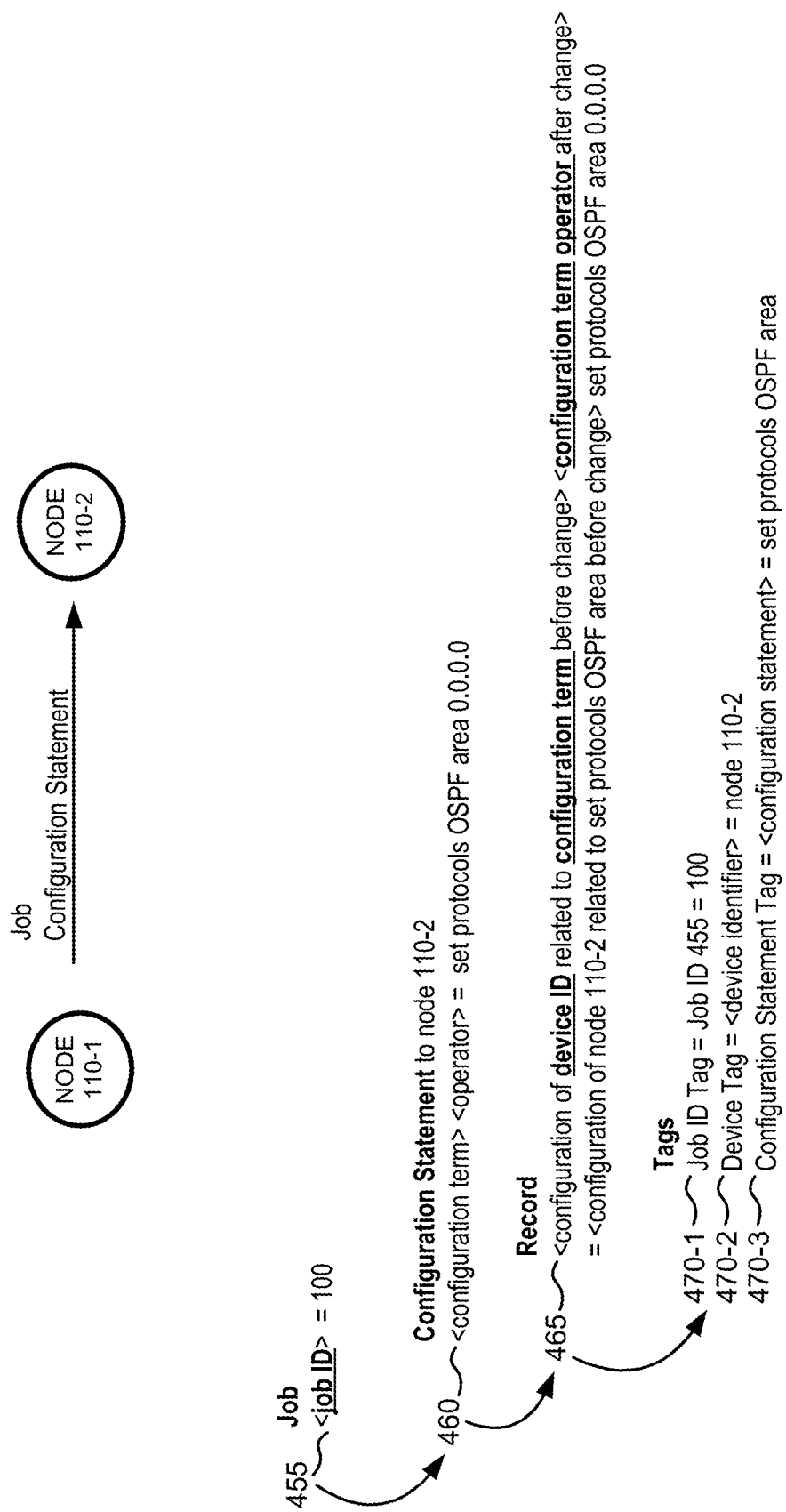
FIG. 4B is a diagram of example tags and/or records created as a result of sending a configuration statement between network nodes of FIG. 1.

FIG. 4B is a diagram of example tags and/or records created as a result of sending a configuration statement between nodes 110. As shown in FIG. 4B, node 110-1 may initiate a job by transmitting a configuration statement to node 110-2. Node 110-2 may receive the configuration statement and may change a configuration, associated with node 110-2, based on the configuration statement.

Management device 120 may, for example, detect configuration statement 460 being transmitted from node 110-1 to node 110-2. Management device 120 may associate job identifier (ID) 455 (e.g., 100) with configuration statement 460. Configuration statement 460 may include a first part that corresponds to a configuration term (e.g., shown as <configuration term>) that identifies a type of configuration change to be performed. Configuration statement 460 may also include a second part that corresponds to an operator (e.g., shown as <operator>) that identifies how the configuration change is to be implemented on node 110-2. In an example configuration statement 460, (e.g., set protocols open shortest path first (OSPF) area 0.0.0.0), the configuration term (e.g., set protocols OSPF area) may indicate that protocols, associated with an OSPF area of node 110-2, are to be set. The operator (e.g., 0.0.0.0) may identify a particular location, within OSPF area, at which the configuration change is to be implemented. Configuration statement 460 is described with respect to set protocols OSPF area for explanatory purposes only. In another implementation, configuration statement 460 may be associated with a different type of configuration change.

Management device 120 may generate record 465 based on a device identifier (e.g., associated with node 110-2), and/or the configuration term and/or the operator associated with configuration statement 460. Record 465 may, for example, include a first part that corresponds to a configuration, associated with a node 110-2, before the configuration change (e.g., shown as <configuration of device ID related to configuration term before change>). Record 465 may include a second part that corresponds to the configuration change to be implemented (e.g., shown as <configuration term operator after change>). Thus, continuing from the example above, the resulting record 465 may include the device ID, the configuration term and the operator (e.g., shown as <configuration of node 110-2 related to set protocols OSPF area before change> set protocols OSPF area 0.0.0.0).

Management device 120 may generate one or more tags 470 based on job ID 455 and record 465. For example, management device 120 may generate job tag 470-1 (e.g., 100) based on job identifier 455. Management device 120 may also, or alternatively, generate device tag 470-2 based on the device identifier (e.g., node 110-2). Management device 120 may also, or alternatively, generate configuration statement tag 470-3 based on the configuration term obtained from record 465 (e.g., set protocols OSPF area).

Figure 5:
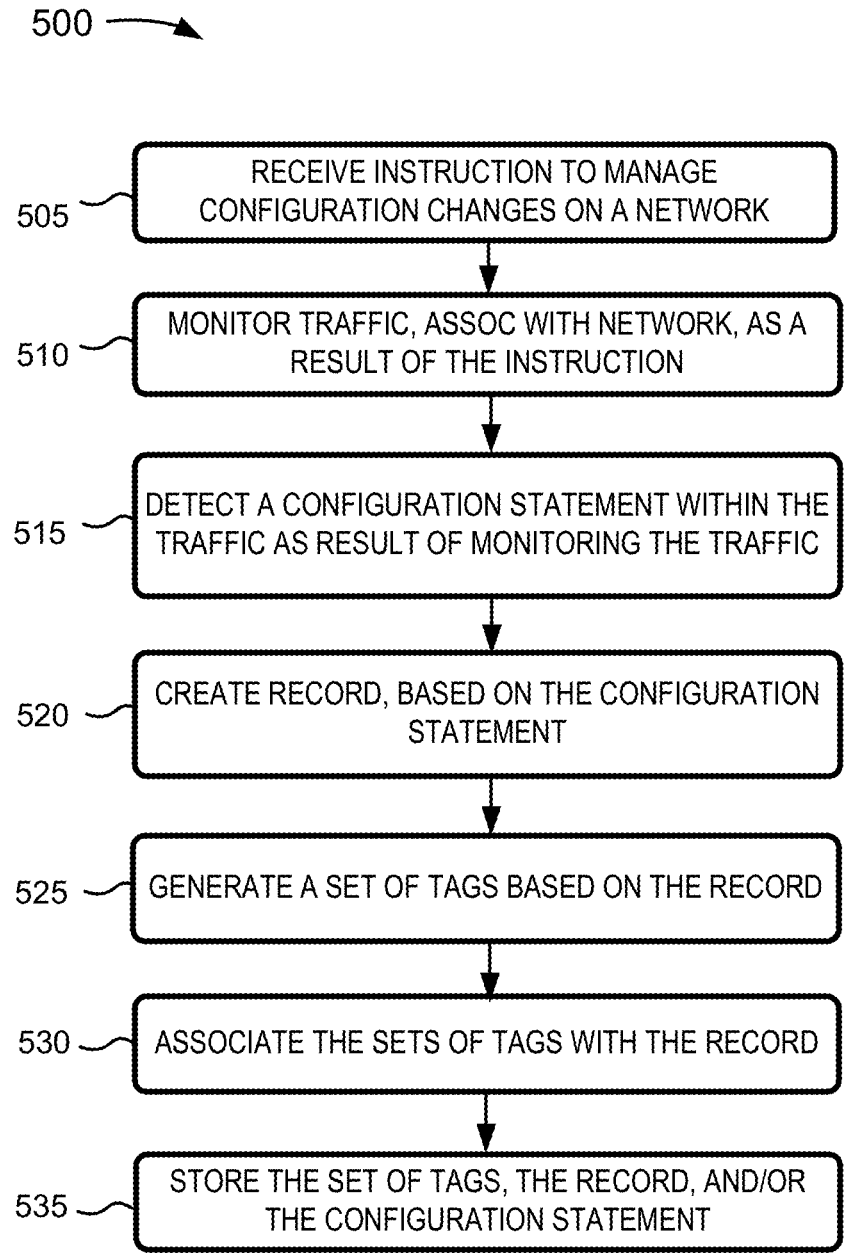
FIG. 5 is a flow chart of an example process for generating one or more tags based on a configuration statement.

FIG. 5 is a flow chart of an example process 500 for generating one or more tags based on a configuration statement. In one example implementation, process 500 may be performed by management device 120. In another example implementation, some or all of process 500 may be performed by a device or collection of devices separate from, or in combination with, management device 120.

As shown in FIG. 5, process 500 may include receiving an instruction to manage configuration changes within a network (block 505) and monitoring traffic, associated with the network, as a result of the instruction (block 510). For example, management device 120 may receive an instruction to manage configuration changes associated with one or more nodes 110 associated with network 100. The instruction may, for example, be received from a network administrator associated with management device 120 and/or from a client application, hosted by the management device 120, at a predetermined time based on programming code associated with the client application. Management device 120 may, as a result of the instruction, monitor flows of packets associated with traffic being transported between the one or more nodes 110. Management device 120 may, for example, monitor packets being sent to and/or received from I/O units 220 associated with node 110, being received and/or transmitted via one or more VLAN ports associated with node 110, being sent to and/or received from a client device with which node 110 is communicating, etc.

As also shown in FIG. 5, process 500 may include detecting a configuration statement within the traffic, as a result of monitoring the traffic (block 515) and creating a record based on the configuration statement (block 520). For example, management device 120 may detect a flow that includes one or more configuration statements (e.g., configuration statement 460 of FIG. 4B) being transmitted from a first node 110 to a second node 110. For example, management device 120 may detect a packet, within a flow, that includes a configuration statement within one or more fields associated with a data structure stored within a packet. The configuration statement may correspond to one or more commands (e.g., edit, set, delete, show, activate, etc.) associated protocols, routing options, forwarding options, security policy, quality of service policies, access policies, etc. associated with node 110 to which the flow is being transmitted. Management device 120 may identify a time at which the configuration statements were transmitted. Management device 120 may also, or alternatively, create a job identifier and may associate the job identifier with the configuration statements. Management device 120 may also, or alternatively, identify one or more applications (e.g., based on an application programming name (APN), a packet data network (PDN), an application identifier stored within the data structure, etc.), hosted by the first node 110, with which the flow, that includes the configuration statements, is associated. Management device 120 may communicate with the second node 110 to identify an existing configuration that exists, on the second node 110, prior implementing a configuration change associated with the configuration statements.

Management device 120 may, in a manner similar to that described in FIG. 4B, generate a respective record (e.g., record 465 of FIG. 4B) for each of the configuration statements. Each record may be based on respective terms (e.g., configuration terms and/or an operator term) obtained from each of the configuration statements. For example, a record may include a first portion that identifies the existing configuration, associated with a configuration term (e.g., set protocols OSPF area) obtained from a configuration statement and an identifier associated with the second node 110. The record may also, or alternatively, include a second portion that identifies a change to the existing configuration to be implemented on the second node 110. The second portion may include the configuration term and/or the operator (e.g., 0.0.0.0) obtained from the configuration statement.

Management device 120 may generate other records associated with other configuration statements transmitted, by the first node 110, to the second node 110 and/or other nodes 110. Thus, a quantity of records, generated by management device 120, may be based on a quantity of configuration statements associated with the identified job and/or a quantity of nodes 110 to which the configuration statements are transmitted.

As further shown in FIG. 5, process 500 may include generating a set of tags based on the record (block 525) and associating the set of tags with the record (block 530). For example, management device 120 may, in a manner similar to that described above with respect to FIG. 4B, generate a set of tags, associated with the record, that includes a job tag, a device tag, and/or a configuration statement tag. For example, management device 120 may generate the job tag based on the job identifier. Additionally, or alternatively, management device 120 may generate the device tag based on a device identifier associated with the second node 110-2. Additionally, or alternatively, management device 120 may generate the configuration statement tag based on a configuration term obtained from the record and/or the configuration statement. Management device 120 may compare the configuration term to one or more standard configuration terms, stored in a memory associated with management device 120. The standard configuration terms may identify types of configuration changes that are permitted and/or which can be used to generate a configuration statement tag. Management device 120 may generate a respective set of tags for each record that is generated by management device 120.

Management device 120 may associate the job tag, the device tag, and the configuration statement tag with the record. Associating the tags with the record may allow the tags to be used as terms, within a search query, to obtain information associated with the job. For example, the job tag may be used to perform a search for information, associated with one or more configuration statements and/or records, to which the job tag corresponds. Additionally, or alternatively, the device tag may be used to perform a search for information, relating to one or more jobs identifiers, configuration statements, and/or records, associated with the second node 110, to which the device tag corresponds. The similarity between the configuration statement tag and the configuration term, obtained from the configuration statement and/or the record, may allow the configuration statement tag to be used to perform search for any jobs, configuration statements, and/or records that include a configuration term to which configuration statement tag corresponds. Performing a search using the tags will be described in greater detail below with respect to FIG. 7.

As still further shown in FIG. 5, process 500 may include storing the sets of tags, the records, and/or the configuration statements (block 535). For example, management device 120 may store the set of tags, the record, and/or the configuration statement in a memory associated with management device 120. Additionally, or alternatively, management device 120 may store, in the memory, the information associated with the job that identifies the flow, the one or more applications, the first node 110 and/or the second node 110, the existing configuration on the second node 110, and/or the time associated with the job. The information, associated with the job, may be stored, within the memory, in a manner that corresponds to the set of tags, the record, and/or the configuration statement.

Figure 6:
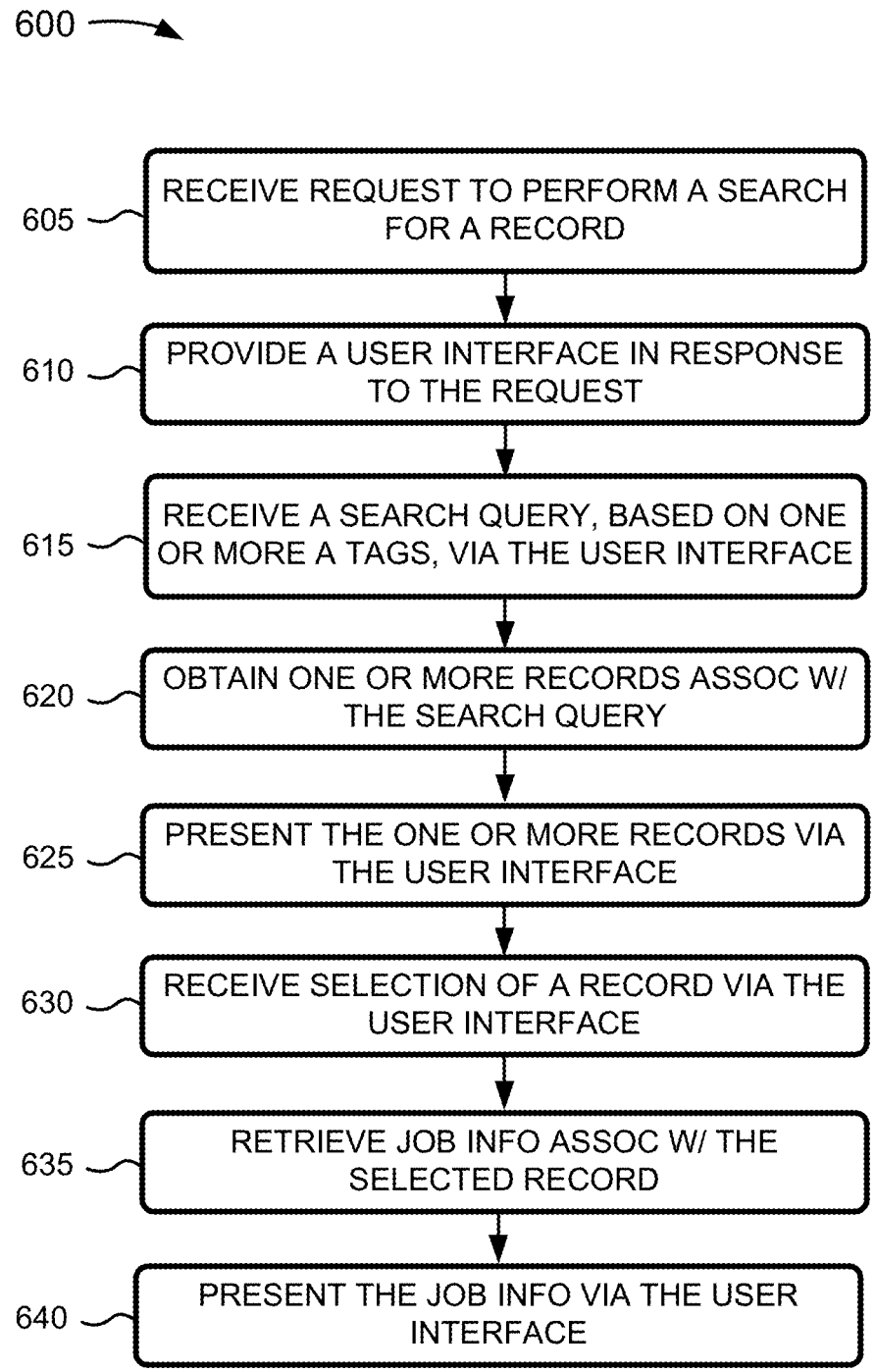
FIG. 6 is a diagram of example tags and/or records created as a result of sending one or more configuration statements between network nodes of FIG. 1.

FIG. 6 is a flow chart of an example process 600 for performing a search for a record using a tag-based search query. In one example implementation, process 600 may be performed by management device 120. In another example implementation, some or all of process 600 may be performed by a device or collection of devices separate from, or in combination with, management device 120. FIG. 7 is a diagram of an example user interface 700 that allows an operator, associated with management device 120, to perform a search for a record. All or a portion of process 600 of FIG. 6 will be described below with references to user interface 700 of FIG. 7.

As shown in FIG. 6, process 600 may include receiving a request to perform a search for a record (block 605) and providing, in response to the request, a user interface (block 610). For example, an operator associated with management device 120 may send a request (e.g., by pressing one or more buttons on a key board, using a pointing device, etc.), to management device 120, to perform a search for a record. Management device 120 may receive the request and may provide a user interface (e.g., user interface 700 of FIG. 7) that allows the user to enter a search query with which to perform a search.

As shown in FIG. 7, user interface 700 may include a collection of fields and/or buttons, such as a device tag search field 705, a job tag search field 710, a configuration search field 715, a search button 717, a records found field 720, a job identifier (ID) field 722, a device ID field 725, an existing configuration field 730, a configuration statement field 735, a time field 740, and an application information field 745. The quantity of fields and/or buttons, included within user interface 700, is provided for explanatory purposes. In another example implementation, there may be fewer fields and/or buttons, additional fields and/or buttons, different fields and/or buttons, and/or differently arranged fields and/or buttons than shown in FIG. 7.

Device tag search field 705 may allow an operator, associated with management device 120, to enter a search query based on a device tag. Job tag search field 710 may allow the operator to enter a search query based on a job tag. Configuration search field 715 may allow the operator to enter a search query based on a configuration statement tag. Search button 717 may, when selected by the operator, cause management device 120 to initiate a search based on the device tag entered into device tag search field 705, the job tag entered into job tag search field 710, and/or the configuration statement tag entered into configuration tag search field 715. In another example implementation, device tag search field 705, job tag search field 710, and/or configuration statement tag search field 715 may be combined into a single field.

Records found field 720 may identify one or more records that management device 120 identifies as relevant to a search query entered into user interface 700 by the operator. Job ID field 722 may correspond to job ID field 405 (FIG. 4A) and may identify a job identifier associated with one or more of the records identified in records found field 720. Device ID field 725 may correspond to receiving device information field 410 (FIG. 4A) and may identify a device identifier associated with one or more of the records identified in records found field 720. The device identifier, in this example, corresponds to the particular node 110 that receives a configuration statement. Existing configuration field 730 may identify an existing configuration that existed on the particular node 110 prior to implementing a configuration statement and which corresponds to one or more of the records identified in records found field 720.

Configuration statement field 735 may store a configuration statement that is transmitted to the particular node 110 and which corresponds to one or more of the records identified in records found field 720. Time field 740 may correspond to time field 415 (FIG. 4A) and may store a time that corresponds to the job identified in job ID field 720. Application information field 745 may correspond to application information field 435 (FIG. 4A) and may identify an application, hosted by node 110 that transmitted the configuration statement identified by configuration statement field 735, that caused node 110 to transmit the configuration statement to the particular node 110. Additionally, or alternatively, user interface 700 may include other fields, such as an operator information field, a transmitting device information field, etc. Operator information field may correspond to operator information field 420 (FIG. 4A) and may identify a network administrator that caused the configuration statement to be transmitted. Transmitting device information field may correspond to transmitting device information field 430 (FIG. 4A) that identifies node 110 that transmitted the configuration statement to the particular node 110.

Returning to FIG. 6, process 600 may include receiving, via the user interface, a search query based on one or more tags (block 615) and obtaining one or more records based on the search query (block 620). For example, the operator may enter a device tag (e.g., 110-2) into device tag search field 705. Additionally, or alternatively, the operator may enter a job tag into job tag search field 710 and/or a configuration statement tag into configuration tag search field 715. The operator may select search button 717, which may cause management device 120 to receive the search query.

Management device 120 may perform a search of a memory associated with management device 120 by comparing one or more tags, included within the search query, with other tags stored within the memory. Management device 120 may identify one or more of the other tags, within the memory, that match. Management device 120 may retrieve, from the memory, one or more records that correspond to the one or more other tags that match.

In another example implementation, management device 120 may enable the operator to enter a command via a command line interface rather than via the user interface. For example, the operator may enter a command (e.g., "show < >," where < > allows the operator to specify an operator, such as a tag, that identifies information to be displayed) to cause management device 120 to retrieve and/or display information identified by the command. Management device 120 may receive the command and may retrieve, from a memory associated with management device 120, one or more records associated with a tag that matches the tag associated with the command. Management device 120 may present the one or more records for display via the command line interface.

As further shown in FIG. 6, process 600 may include presenting, via the user interface, the one or more records (block 625) and receiving, via the user interface, selection of a record (block 630). For example, management device 120 may present for display, on a display device associated with management device 120 and via the user interface, the records retrieved from the memory. Additionally, or alternatively, management device 120 may transmit the records to another device for display, processing, etc.

As shown in FIG. 7, records found field 720 may identify the one or more records 750 (e.g., <configuration of node 110-2 related to set protocols . . . ) retrieved from the memory. The operator may select one or more, or all, of the records which may cause the records to change appearance (e.g., as shown by the shaded color) and management device 120 may receive selection of the one or more records via user interface 700.

As yet further shown in FIG. 6, process 600 may include retrieving job information associated with the selected record (block 635) and presenting, via the user interface, the job information. For example, management device 120 may retrieve, from the memory, job information (e.g., job information stored in data structure 400 (FIG. 4A)) associated with the selected one or more records 750. Additionally, or alternatively, management device 120 may present job information 755 for display via user interface 700. For example, management device 120 may present first job information 755-1 that corresponds to a first record 750. First job information 755-1 may include a job identifier (e.g., 101), a device identifier (e.g., 110-2), information associated with an existing configuration (e.g., protocol OSPF . . . ), a configuration statement (e.g., set protocol OSPF area 0.0 . . . ), a time when job 101 was performed (e.g., 12:46:36), and an application identifier (e.g., app A) that triggered the configuration statement. First job information 755-1 may have been determined, by management device 120, to be relevant to a search query based on the device tag (e.g., 110-2) entered into device tag search field 705.

Additionally, or alternatively, management device 120 may present second job information 755-2 that corresponds to a second record 750. Second job information 755-2 may include the job identifier (e.g., 101), the device identifier (110-2), information associated with an existing configuration (e.g., routing options static . . . ), a configuration statement (e.g., set routing options static . . . ), a time when job 101 was performed (e.g., 12:46:36), and an application identifier (e.g., app B) that triggered the configuration statement. Second job information 755-2 may have been determined, by management device 120, to be relevant to the search query based on the device tag (e.g., 110-2) entered into device tag search field 705.

Additionally, or alternatively, management device 120 may present other job information 755-3 and/or 755-4 that corresponds to a record that was obtained as a result of the search query based on the device tag (e.g., 110-2). Management device 120 may allow the user to perform other searches based on a job tag and/or a configuration tag.

Records 750 and/or job information 755 may represent a configuration history associated with nodes 110-2 and/or 110-3. An operator, associated with management device 120 may use records 750 and/or job information 755 to identify a condition associated with network 100 and/or to troubleshoot a condition that has been detected on network 100. For example, records 750 and/or job information 755 may allow a network administrator to determine that a configuration statement was received by node 110 that should not have been received by node 110. Additionally, or alternatively, records 750 and/or job information 755 may allow an operator to identify configuration statements, received by node 110, that are in conflict or cause node 110 to establish policies or protocols that are not compatible with node 110. Additionally, or alternatively, records 750 and/or job information 755 may allow the network administrator to identify a record or job information associated with a configuration statement that was received, by node 110, at a time when node 110 begin to malfunction.

A system and/or method, described herein, may enable a management device to monitor traffic within a network to detect a configuration statement being transported between network nodes within a network. The management device may create one or more records based on the configuration statement and one or more nodes that received the configuration statement. The management device may generate one or more types of tags for each of the configuration statements. The management device may perform a search based on a tag-based search query received from an operator of the management device. The management device may obtain records that are relevant to the tag-based search query. Performing searches based on tag-based search queries, may allow the operator to monitor and control configuration changes within the network and/or to identify and troubleshoot a condition associated with the network node.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 5 and 6, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    detecting, by a device and within a data flow being transmitted from a first network node to a second network node, a packet that includes a configuration statement,
        a network including the first network node and the second network node,
        the configuration statement identifying a first configuration to be implemented on the second network node, and
        the configuration statement including:
            a configuration term that identifies a type of protocol configuration change to be implemented on the second network node, and
            an operator term that identifies how the second network node is to implement the protocol configuration change;
    identifying, by the device, a time at which the packet was transmitted;
    generating, by the device and based on detecting the packet within the data flow, a record associated with the configuration statement,
        the record including:
            a first identifier associated with the second network node, information identifying a second configuration existing on the second network node prior to the first configuration being implemented on the second network node,
the configuration term, and
the operator term;
generating, by the device, one or more tags based on at least one of:
the first identifier,
the information identifying the second configuration,
the configuration term, or
the operator term;
associating, by the device and in a memory associated with device, the one or more tags with the record based on the time at which the packet was transmitted;
identifying, by the device, a job associated with the configuration statement,
the job being performed on the second network node;
associating, by the device, a second identifier with the job;
generating, by the device, job information that includes at least one of:
the first identifier,
the second identifier,
a third identifier associated with the first network node, or
the information identifying the second configuration; and
associating, by the device, the job information with the record and the one or more tags.

2. The method of claim 1, further comprising:
receiving a search query that includes information identifying a first tag of the one or more tags;
searching the one or more tags based on the search query;
identifying the first tag based on searching the one or more tags;
obtaining the record based on identifying the first tag; and
providing the record for display.

3. The method of claim 1, where generating the one or more tags includes:
generating a first tag, of the one or more tags, based on at least one of the configuration term or the operator term; and
generating a second tag, of the one or more tags, based on the first identifier.

4. The method of claim 1, further comprising:
receiving a search query that includes at least one of:
the first identifier,
the second identifier,
the third identifier, or
the information identifying the second configuration;
searching the one or more tags based on the search query;
identifying at least one tag, of the one or more tags, based on searching the one or more tags;
retrieving the job information based on identifying the at least one tag; and
providing the job information.

5. The method of claim 1, further comprising:
monitoring traffic associated with the network; and
where detecting the packet that includes the configuration statement comprises:
detecting the packet based on monitoring the traffic associated with the network.

6. The method of claim 1,
where generating the one or more tags includes:
generating a tag, of the one or more tags, based on the second identifier.

7. The method of claim 6, where generating the one or more tags includes:
generating a first tag, of the one or more tags, based on the second identifier;
generating a second tag, of the one or more tags, based on at least one of the configuration term or the operator term; and
generating a third tag, of the one or more tags, based on the first identifier; and
where the method further comprises:
receiving a search query that includes:
information identifying the first tag,
information identifying the second tag, and
information identifying the third tag;
searching the one or more tags based on the search query;
identifying, based on searching the one or more tags, a set of tags, of the one or more tags,
the set of tags including the first tag, the second tag, and the third tag;
obtaining the record based on identifying the set of tags; and
providing the record for display.

8. A device comprising:
a memory; and
one or more processors to:
detect a packet, that includes a configuration statement, within a data flow being transmitted from a first network node, of a network, to a second network node of the network,
the configuration statement identifying a first configuration to be implemented on the second network node, and
the configuration statement including information identifying a particular configuration change to be implemented on the second network node;
identify a time at which the packet was transmitted;
generate, based on detecting the packet within the data flow, a record associated with the configuration statement,
the record including:
a first identifier associated with the second network node,
information identifying a second configuration existing on the second network node prior to the first configuration being implemented on the second network node, and
the information identifying the particular configuration change;
generate one or more tags based on at least one of:
the first identifier,
the information identifying the second configuration, or
the information identifying the particular configuration change;
associate, in the memory, the one or more tags with the record based on the time at which the packet was transmitted;
identify a job associated with the configuration statement,
the job being performed on the second network node;
associate a second identifier with the job;
generate job information that includes at least one of:
the first identifier,
the second identifier,
a third identifier associated with the first network node, or the information identifying the second configuration; and associate the job information with the record and the one or more tags.

9. The device of claim 8, where the particular configuration change includes at least one of:
a change in a forwarding protocol associated with the second network node,
a change in a routing protocol associated with the second network node,
a change in a security policy associated with the second network node,
a change in a quality of service policy associated with the second network node, or
a change in a virtual local area network port configuration associated with the second network node.

10. The device of claim 8,
where the one or more processors are further to:
identify, based on the configuration statement, a job associated with the first network node; and
associate the third identifier with the job.

11. The device of claim 8, where the one or more processors are further to:
receive a search query that includes at least one of:
the first identifier,
the second identifier,
the information identifying the second configuration, or
the information identifying the particular configuration change;
search the one or more tags based on the search query;
identify at least one tag, of the one or more tags, based on searching the one or more tags;
retrieve the job information based on identifying the at least one tag; and
provide the job information for display.

12. The device of claim 8, where the configuration statement includes:
a configuration term that identifies a type associated with the particular configuration change to be implemented on the second network node, and
an operator term that identifies how the second network node is to implement the particular configuration change.

13. The device of claim 8, where the one or more processors are further to:
monitor traffic associated with the network; and
where the one or more processors, when detecting the packet that includes the configuration statement, are to:
detect the packet based on monitoring the traffic associated with the network.

14. The device of claim 8, where, when generating the one or more tags, the one or more processors are to:
generate a first tag, of the one or more tags, based on the first identifier;
generate a second tag, of the one or more tags, based on the information identifying the second configuration;
generate a third tag, of the one or more tags, based on the information identifying the particular configuration change; and
generate a fourth tag, of the one or more tags, based on the second identifier.

15. The device of claim 14, where the one or more processors are further to:
receive a search query that includes at least one of:
information identifying the first tag,
information identifying the second tag,
information identifying the third tag, or
information identifying the fourth tag;
search the one or more tags based on the search query;
identify, based on searching the one or more tags, at least one tag of the one or more tags,
the at least one tag including at least one of the first tag, the second tag, the third tag, or the fourth tag;
obtain the record based on identifying the at least one tag; and
provide the record for display.

16. One or more non-transitory computer-readable media storing instructions, the instructions comprising:
one or more instructions that, when executed by one or more processors of a device, cause the one or more processors to:
detect a packet, that includes a configuration statement, within a data flow being transmitted via traffic from a first network node, of a network, to a second network node of the network,
the configuration statement identifying a first configuration to be implemented on the second network node, and including information identifying a particular configuration change to be implemented on the second network node;
identify a time at which the packet was transmitted;
generate, based on detecting the packet within the data flow, a record associated with the configuration statement,
the record including:
a first identifier associated with the second network node,
information identifying a second configuration existing on the second network node prior to the first configuration being implemented on the second network node, and
the information identifying the particular configuration change;
generate one or more tags based on at least one of:
the first identifier,
the information identifying the second configuration, or
the information identifying the particular configuration change;
associate the one or more tags with the record based on the time at which the packet was transmitted;
identify a job associated with the configuration statement,
the job being performed on the second network node;
associate a second identifier with the job;
generate job information that includes at least one of:
the first identifier,
the second identifier,
a third identifier associated with the first network node, or
the information identifying the second configuration; and
associate the job information with the record and the one or more tags.

17. The one or more non-transitory computer-readable media of claim 16, where the particular configuration change includes at least one of:
a change in a forwarding protocol associated with the second network node,
a change in a routing protocol associated with the second network node,
a change in a security policy associated with the second network node, a change in a quality of service policy associated with the second network node, or a change in a virtual local area network port configuration associated with the second network node.

18. The one or more non-transitory computer-readable media of claim 16, where the one or more instructions that, when executed by the one or more processors, further cause the one or more processors to:

monitor traffic associated with the network; and wherein the one or more instructions, that cause the one or more processors to detect the packet that includes the configuration statement, cause the one or more processors to:

detect the packet that includes the configuration statement based on monitoring the traffic associated with the network.

19. The one or more non-transitory computer-readable media of claim 16, where the one or more instructions that, when executed by the one or more processors, further cause the one or more processors to:

generate a first tag, of the one or more tags, based on the first identifier;

generate a second tag, of the one or more tags, based on the information identifying the second configuration; and generate a third tag, of the one or more tags, based on the information identifying the particular configuration change.

20. The one or more non-transitory computer-readable media of claim 19, where the one or more instructions that, when executed by the one or more processors, further cause the one or more processors to:

receive a search query that includes at least one of:
information identifying the first tag,
information identifying the second tag, or
information identifying the third tag;

search the one or more tags based on the search query;

identify, based on searching the one or more tags, at least one tag of the one or more tags,
the at least one tag including the first tag, the second tag, or the third tag;

obtain the record based on identifying the at least one tag; and provide the record for display.

* * * * *